United States Patent

Jung

(10) Patent No.: US 8,718,800 B2
(45) Date of Patent: May 6, 2014

(54) APPARATUS FOR CHANGING MODE IN PROPORTIONAL INTEGRAL DIFFERENTIAL CONTROLLER

(75) Inventor: Tae Soo Jung, Anyang (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 529 days.

(21) Appl. No.: 13/078,842

(22) Filed: Apr. 1, 2011

(65) Prior Publication Data

US 2011/0251701 A1 Oct. 13, 2011

(30) Foreign Application Priority Data

Apr. 9, 2010 (KR) .................. 10-2010-0032914

(51) Int. Cl.
*G05B 13/02* (2006.01)

(52) U.S. Cl.
USPC .......................................... 700/42

(58) Field of Classification Search
CPC ............. G05B 11/42; G05B 19/18; G05B 2219/42033; G05B 2219/42126
USPC .......................................... 700/42
See application file for complete search history.

(56) References Cited

U.S. PATENT DOCUMENTS

| | | | | |
|---|---|---|---|---|
| 5,587,896 | A * | 12/1996 | Hansen et al. | 700/28 |
| 6,317,637 | B1 * | 11/2001 | Limroth | 700/42 |
| 2005/0052149 | A1 * | 3/2005 | Kameyama | 318/600 |

FOREIGN PATENT DOCUMENTS

| | | |
|---|---|---|
| CN | 1434376 | 8/2003 |
| CN | 1580409 | 2/2005 |
| CN | 101226376 | 7/2008 |
| CN | 101349890 | 1/2009 |
| CN | 101667019 | 3/2010 |
| JP | 02-044401 | 2/1990 |
| JP | 04-232501 | 8/1992 |
| JP | 2795419 | 9/1998 |
| JP | 11-175875 | 7/1999 |
| JP | 2000-172301 | 6/2000 |
| KR | 10-0971240 | 7/2010 |

OTHER PUBLICATIONS

The State Intellectual Property Office of the People's Republic of China Application Serial No. 201110090210.0, Office Action dated Dec. 10, 2012, 6 pages.
Japan Patent Office Application Serial No. 2011-084660, Office Action dated Apr. 23, 2013, 2 pages.

* cited by examiner

*Primary Examiner* — Sean Shechtman
*Assistant Examiner* — Chad Rapp
(74) *Attorney, Agent, or Firm* — Lee, Hong, Degerman, Kang & Waimey

(57) ABSTRACT

Disclosed is an apparatus for changing a mode in a proportional integral differential (PID) controller, which removes an impact generated in a mode change and stably performs the mode change when the operational mode of the PID controller is changed from a manual mode into an automatic mode or vice versa. The apparatus includes a PID operator configured to generate a driving signal by performing a PID operation in an automatic mode or a manual mode based on a manual mode change signal or an automatic mode change signal; a manual mode buffer configured to process the generated driving signal and output the processed driving signal to a load driver when the manual mode change signal is generated; and a speed difference integral calculator configured to analyze the generated driving signal and output the analyzed driving signal to the PID operator when the automatic mode change signal is generated.

7 Claims, 3 Drawing Sheets

APPARATUS FOR CHANGING MODE IN PROPORTIONAL INTEGRAL DIFFERENTIAL CONTROLLER

CROSS-REFERENCE TO RELATED APPLICATION

Pursuant to 35 U.S.C. §119(a), this application claims the benefit of earlier filing date and right of priority to Korean Patent Application No. 10-2010-0032914, filed on Apr. 9, 2010, the contents of which is hereby incorporated herein by reference in its entirety.

BACKGROUND OF THE INVENTION

1. Field of the Invention

The present invention relates to an apparatus and a method for changing a mode in a proportional integral differential controller (hereinafter, referred to as a PID controller). More specifically, the present invention relates to an apparatus and a method for changing a mode in a PID controller, which can remove an impact generated in a mode change and stably perform the mode change when the operational mode of the PID controller is changed from a manual mode to an automatic mode or vice versa.

2. Description of the Related Art

In general, a PID controller is widely used to control the driving of various types of loads including an electric motor and the like. The operational modes of the PID controller that drives a load are divided into an automatic mode and a manual mode.

In the automatic mode, the PID controller determines the current state of the load by inputting a speed detection signal to the load, and generates a driving signal for driving the load by PID-controlling the determined state of the load and a speed command signal set by a user. Then, the PID controller drives the load based on the generated driving signal.

Thus, the automatic mode is used to drive the load in a state desired by the user according to the current operational state of the load, and the PID controller can stably drive the load by repeatedly performing an operation without a pause.

In the manual mode, the PID controller drives the load by generating a driving signal based on the speed command signal set by the user, regardless of the state of the load fed back from a system.

The automatic and manual modes of the PID controller can be changed when the user so desires. However, in a case where a mode change is performed in the state that the load is driven based on an output signal of the PID controller, an overload is applied to the system, and an impact is generated due to the mode change.

For example, in a case where the operational mode of the PID controller is changed from the automatic mode to the manual mode, the PID controller outputs a driving signal based on only the speed command signal in the state that the PID controller outputs the driving signal according to the difference value between the speed detection signal and the speed command signal.

If the value of the driving signal outputted from the PID controller is greatly changed, the driving state of the load is greatly changed, and the change in the driving state of the load is transferred to the system as it is. Therefore, an overload is applied to the system.

Thus, in a case where the operational mode of the PID controller is changed from the automatic mode into the manual mode, the generation of an impact generated in the mode change is restricted by limiting the variation of a driving signal outputted from the PID controller, and accordingly, the overload of the system is prevented.

However, if the variation of the driving signal outputted from the PID controller is limited in the mode change, a response speed is delayed.

Further, in a case where the operational mode of the PID controller is changed from the manual mode into the automatic mode, the PID controller performs a PID control from an initial value, and hence it takes much time for the PID controller to drive a load in a stable state. Therefore, the driving speed of the load is not constantly stable, and accordingly, the system is vibrated.

SUMMARY OF THE INVENTION

Embodiments of the present invention provide an apparatus for changing a mode in a PID controller capable of reducing an impact generated in a mode change while not limiting the variation of a driving signal, when the operational mode of the PID controller is changed from an automatic mode into a manual mode.

Embodiments of the present invention also provide an apparatus for changing a mode in a PID controller capable of stably changing a mode while restricting the occurrence of a time delay, vibration or the like, when the operational mode of the PID controller is changed from an automatic mode into a manual mode.

It is to be understood that technical problems to be solved by the present invention are not limited to the aforementioned technical problems and other technical problems which are not mentioned will be apparent from the following description to the person with an ordinary skill in the art to which the present invention pertains.

According to one general aspect of the present invention, there is provided an apparatus for changing a mode in a PID controller, the apparatus comprising: a PID operator configured to generate a driving signal by performing a PID operation in an automatic mode or a manual mode based on a manual mode change signal or an automatic mode change signal; a manual mode buffer configured to process the driving signal generated by the PID operator and output the processed driving signal to a load driver when the manual mode change signal is generated; and a speed difference integral calculator configured to analyze the driving signal generated by the PID operator and output the analyzed driving signal to the PID operator when the automatic mode change signal is generated.

The manual mode buffer may include a timer configured to generate a switching signal during a predetermined time when the manual mode change signal is generated, a filter configured to buffer the driving signal generated by the PID operator, and a plurality of switches configured to input the driving signal generated by the PID operator to the filter or bypass the driving signal generated by the PID operator to the load driver, based on the switching signal.

The filter may be a lag filter that performs high-frequency filtering on the driving signal outputted by the PID operator.

The speed difference integral calculator may calculate a speed difference integral signal included in the driving signal generated by the PID operator when the automatic mode change signal is generated. The PID operator may generate a driving signal by replacing a speed difference integral signal of a driving signal to be generated with the speed difference integral signal calculated by the speed difference integral calculator at an initial stage in which the automatic mode change signal is generated.

According to an aspect of the present invention, there is provided a method for changing a mode in a proportional integral differential (PID) controller, the method comprising: generating a driving signal by performing a PID operation in an automatic mode or a manual mode based on a manual mode change signal or an automatic mode change signal; processing the driving signal and outputting the processed driving signal to a load driver when the manual mode change signal is generated; and analyzing the driving signal and outputting the analyzed driving signal when the automatic mode change signal is generated.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

The present invention is described more fully hereinafter with reference to the accompanying drawings, in which embodiments of the present invention are shown. This present invention may, however, be embodied in many different forms and should not be construed as limited to the embodiments set forth herein. Rather, these embodiments are provided so that this disclosure is thorough, and will fully convey the scope of the present invention to those skilled in the art.

Figure 1:
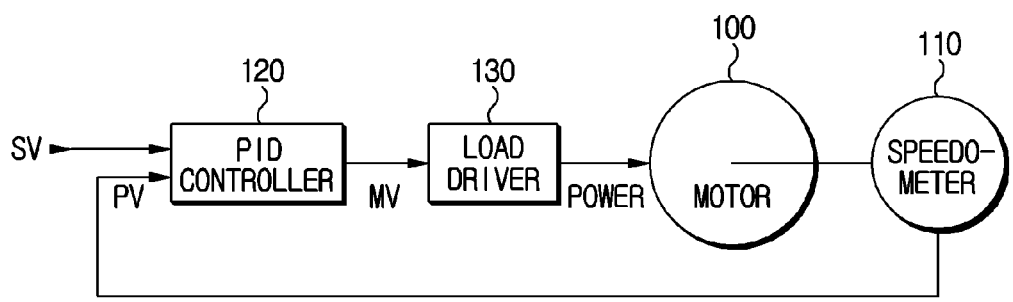
FIG. 1 is a block diagram showing a configuration of a speed control apparatus of an electric motor using a PID control.

FIG. 1 is a block diagram showing a configuration of a speed control apparatus of an electric motor using a PID control. The speed control apparatus may include a PID controller 120, a load driver 130, a load 100, a speedometer 110, and the like. The load 100 may include, for example, an electric motor. The speedometer 110 generates a speed detection signal PV by detecting the rotation speed of the load 100. The PID controller 120 generates a driving signal MV for driving the load 100 by PID-controlling a speed command signal SV inputted under an operation of a user and the speed detection signal PV of the electric motor 100. The load driver 130 drives the load 100 by generating driving power based on the driving signal MV outputted by the PID controller 120.

In a case where the electric motor that is the load 100 is driven in the speed control apparatus configured as described above, the speed command signal SV set under the operation of the user is inputted to the PID controller 120.

The speedometer 110 generates a speed detection signal PV by detecting the rotation speed of the load 100, and the generated speed detection signal PV is inputted the PID controller 120.

In a case where the currently set operational mode of the PID controller 120 is an automatic mode, the PID controller 120 determines a difference value between the speed command signal SV and the speed detection signal PV and generates a driving signal MV for driving the load 100 based on the determined difference value. The generated driving signal MV is inputted to the load driver 130.

Then, the load driver 130 generates driving power corresponding to the driving signal MV, and the electric motor 100 is driven and rotated by the generated driving power.

In a case where the currently set operational mode of the PID controller 120 is a manual mode, the PID controller 120 generates a driving signal MV based on the speed command signal SV regardless of the amplitude of the speed detection signal PV fed back from the speedometer 110, and the generated driving signal MV is inputted to the load driver 130.

Then, the load driver 130 generates driving power corresponding to the driving signal MV, and the electric motor 100 is driven and rotated by the generated driving power.

Figure 2:
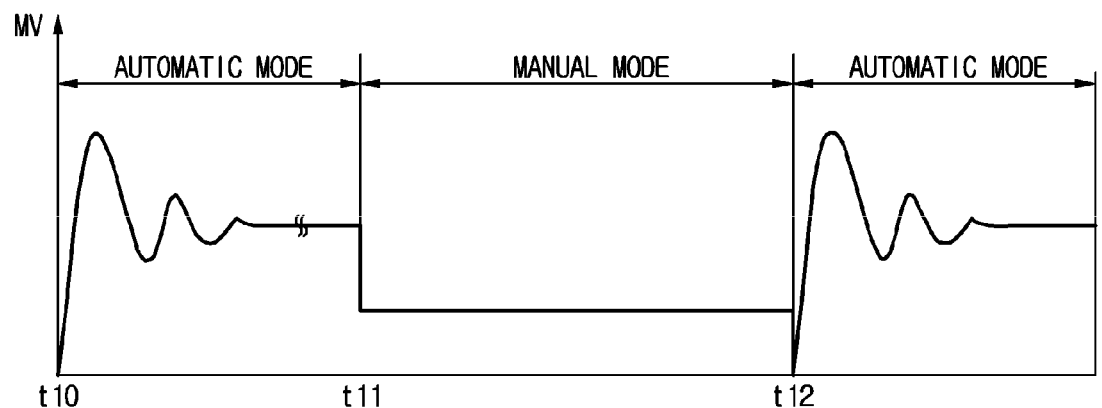
FIGS. 2 and 3 are graphs showing changes in output signal of the PID controller when a mode is changed in the speed control apparatus of FIG. 1.
Figure 3:
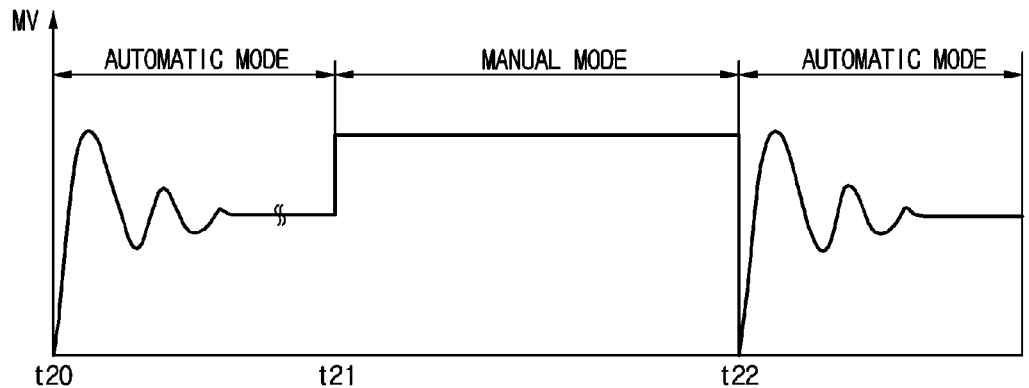

That is, if the PID controller 120 is operated in the automatic mode at times t10 and t20 as shown in FIGS. 2 and 3, the PID controller 120 initially generates a vibrating driving signal MV. As time elapses, the PID controller 120 generates the driving signal MV in a stable state, so that the load driver 130 stably drives the load 100.

If the operational mode of the PID controller 120 is changed into the manual mode at times t11 and t21 in the state that the PID controller 120 is operated in the automatic mode, the value of the driving signal MV outputted by the PID controller 120 may be rapidly decreased as shown in FIG. 2 or may be rapidly increased as shown in FIG. 3.

That is, in the automatic mode, the PID controller 120 calculates a difference value between the speed detection signal PV fed back from the speedometer 110 and the speed command signal SV set by the user, and generates a driving signal MV based on the calculated difference value.

If the operational mode of the PID controller 120 is changed into the manual mode in the state described above, the PID controller 120 generates a driving signal MV based on the speed command signal SV set by the user regardless of the speed detection signal PV. Therefore, the value of the driving signal MV outputted by the PID controller 120 may be rapidly decreased or may be rapidly increased.

If the value of the driving signal MV is rapidly decreased as described above, a low-load impact is generated which allows the load driver 130 to rapidly decrease the driving speed of the load 100. If the value of the driving signal MV is rapidly increased as described above, a high-load impact is generated which allows the load driver 130 to rapidly increase the driving speed of the load 100.

If the low-load impact or high-load impact is generated, a heavy burden is imposed on the load 100. In the low-load impact or high-load impact is repeated for a long period of time, the lifetime of the load 100 is shortened.

If the operational mode of the PID controller 120 is changed into the automatic mode at times t12 and t22 in the state that the PID controller 120 is operated in the manual mode, the PID controller 120 generates a driving signal MV by performing a PID control from an initial value, and therefore, it takes much time until the load 100 is driven at a stable speed. Further, the PID controller 120 generates a vibrating driving signal MV until the load 100 is driven at the stable speed, and the load driver 130 drives the load 100 based on the vibrating driving signal MV. Therefore, the driving speed of the load 100 is vibrated, and a system operated according to the driving of the load 100 is also vibrated.

Figure 4:
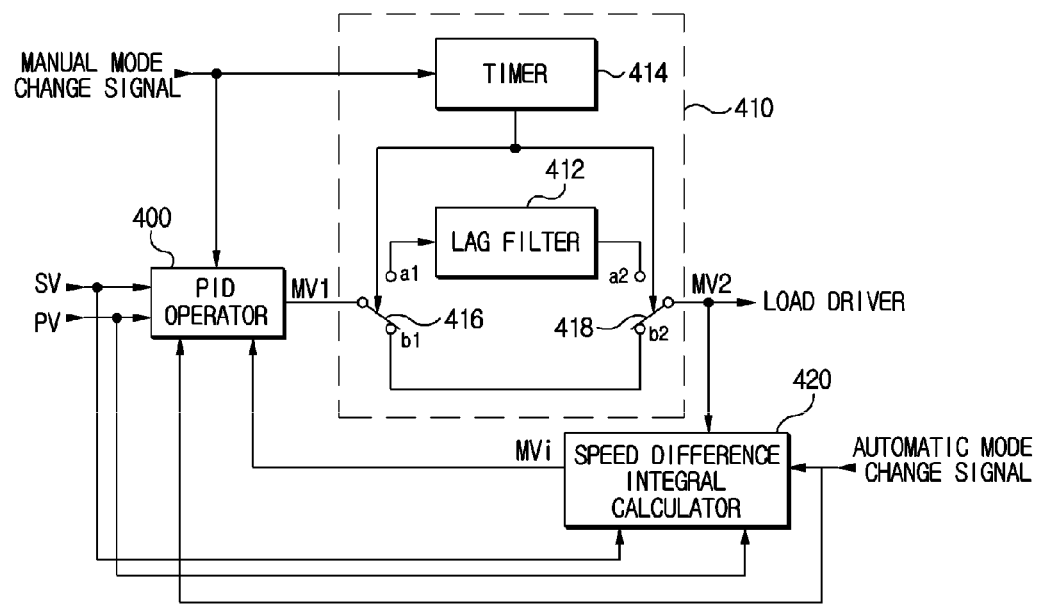
FIG. 4 is a block diagram showing a configuration of an apparatus for changing a mode in a PID controller according to an embodiment of the present invention.

FIG. 4 is a block diagram showing a configuration of an apparatus for changing a mode in a PID controller according to an embodiment of the present invention. The apparatus may include a PID operator 400, a manual mode buffer 410, a lag filter 412, a timer 414 and a speed difference integral calculator 420.

The PID operator 400 is operated in a manual or automatic mode based on a manual or automatic mode change signal. In the automatic mode, the PID operator 400 generates a driving signal MV1 by performing a PID control according to the difference value between a speed detection signal PV and a speed command signal SV. In the manual mode, the PID operator 400 generates a driving signal MV1 by performing a PID control according to the speed command signal SV. The PID operator 400 also generates a driving signal MV1 based on a speed difference integral signal MVi fed back from the speed difference integral calculator 420 at an initial stage in which the operational mode of the PID operator 400 is changed from the manual mode into the automatic mode.

The manual mode buffer 410 buffers the driving signal MV1 outputted by the PID operator 400 using high-frequency filtering and outputs the buffered driving signal MV2 to a load driver during a time predetermined at an initial stage in which the operational mode of the PID operator 400 is changed from the automatic mode into the manual mode.

The manual mode buffer 410 includes the lag filter 412 that is a high-frequency filter, the timer 414 and switches 416 and 418.

The lag filter 412 buffers the driving signal MV1 outputted by the PID operator 400 using the high-frequency filtering.

The timer 414 is triggered based on a manual mode change signal so as to generate a switching signal during a predetermined time.

The switches 416 and 418 are switched based on the switching signal outputted by the timer 414 so that an output signal of the PID operator 400 is buffered through the lag filter 412 and then outputted to the load driver during the predetermined time of the timer 414. In a case where the predetermined time of the timer 414 elapses, the output signal of the PID operator 400 is immediately outputted to the load driver.

The speed difference integral calculator 420 calculates a speed difference integral signal MVi based on the driving signal MV2 outputted to the load driver, the speed detection signal PV and the speed command signal SV and feeds back the calculated speed difference integral signal MVi to the PID operator 400 at the initial stage in which the operational mode of the PID operator 400 is changed from the manual mode into the automatic mode.

According to the apparatus configured as described above, in the automatic mode, the PID operator 400 generates a driving signal MV1 by performing a PID control based on a speed command signal SV set by a user and a fed-back speed detection signal PV, and the generated driving signal MV1 is outputted to the load driver through the switches 416 and 418. Thus, the load driver drives a load based on the driving signal MV1.

In a case where a manual mode change signal is inputted in this state, the PID operator 400 is operated in the manual mode. That is, the PID operator 400 generates the driving signal MV1 by performing the PID control based on the speed command signal SV set by the user.

The manual mode change signal is inputted to the timer 414 of the manual mode buffer 410. Then, the timer 414 is triggered to generate a switching signal while counting a predetermined time, so that the operational terminals of the switches 416 and 418 are connected to one fixed terminals a1 and a2, respectively. After the predetermined time, the operational terminals of the switches 416 and 418 are connected to the other fixed terminals b1 and b2, respectively.

Then, the driving signal MV1 outputted by the PID operator 400 is inputted to the lag filter 412 through the switch 416 so that a variation of the driving signal MV1 is buffered using high-frequency filtering. A driving signal MV2 obtained by buffering the variation of the driving signal MV1 is outputted to the load driver through the switch 418 so that the load driver drives the load based on the driving signal MV2.

Figure 5:
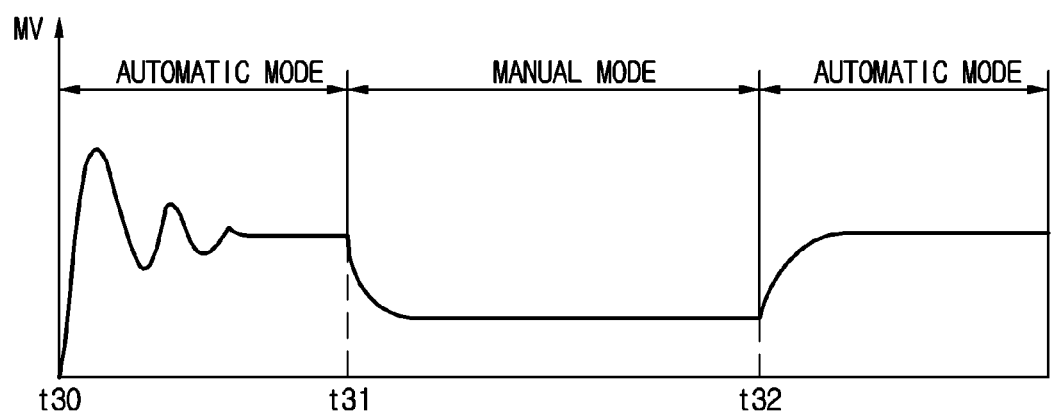
FIGS. 5 and 6 are graphs showing changes in output signal when a mode is changed in the apparatus.
Figure 6:
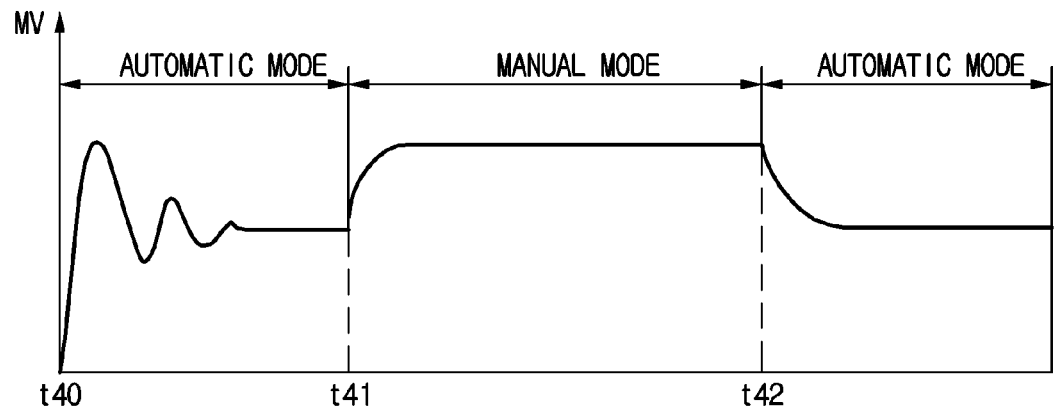

That is, in the state that the PID operator 400 is operated in the automatic mode at times t30 and t40 as shown in FIGS. 5 and 6, a manual mode change signal is inputted to the timer 414 at times t31 and t41 so that the timer 414 operates at an initial stage in which the manual mode of the PID operator 400 is started and generates a switching signal during the predetermined time.

Thus, a variation of the driving signal MV1 outputted by the PID operator 400 is buffered using the high-frequency filtering through the lag filter 412 as shown in FIGS. 5 and 6, and the driving signal MV2 obtained by buffering the variation of the driving signal MV1 is outputted to the load driver.

Accordingly, although the value of the driving signal MV1 outputted by the PID operator 400 is greatly changed when the operational mode of the PID operator 400 is changed from the automatic mode into the manual mode, the value of the driving signal MV1 is buffered, so that the load driver slowly varies the driving speed of the load. As a result, an impact caused by a mode change is not generated.

In a case where an automatic mode change signal is inputted at times t32 and t42 in the state that the PID operator 400 is operated in the manual mode, the PID operator 400 is operated in the automatic mode.

In this state, the speed difference integral calculator 420 calculates a speed difference integral signal MVi, and the calculated speed difference integral signal MVi is inputted to the PID operator 400.

Then, the PID operator 400 operating in the automatic mode replaces a speed difference integral signal of a driving signal MV1 to be generated with the speed difference integral signal MVi outputted by the speed difference integral calculator 420, thereby generating a driving signal MV.

Thus, the driving signal MV outputted by the PID operator 400 at the initial stage in which the operational mode of the PID operator 400 is changed from the manual mode into the automatic mode is changed starting from the value of the driving signal MV that has been outputted in the manual mode as shown in FIGS. 5 and 6. Accordingly, the value of the driving signal MV outputted by the PID operator 400 is not vibrated.

Hereinafter, the operation will be described in detail, in which as the PID operator 400 generates the driving signal MV by replacing the speed difference integral signal MVi outputted by the speed difference integral calculator 420, the value of the driving signal MV outputted by the PID operator 400 is changed starting from the value of the driving signal MV that has been outputted in the manual mode.

The driving signal MV outputted from the PID operator 400 by performing a PID operation contains a proportional operation element, an integral operation element and a differential operation element. In a case where a variation in error occurs among the elements contained in the driving signal MV, only the proportional operation element and the integral operation element are remained by excluding the differential operation element that instantaneously appears and disappears.

When considering only the proportional operation element and the integral operation element, the proportional operation element and the integral operation element can be restored using the driving signal MV outputted by the PID operator 400.

The value of the driving signal MV outputted by the PID operator 400 may be defined by the following Equation 1.

$$MV = MVp + MVi + MVd \qquad \text{Equation 1}$$

In the Equation 1, MVp denotes a speed difference signal subjected to proportional operation, MVi denotes a speed difference integral signal subjected to integral operation, and MVd denotes a speed difference differential signal subjected to differential operation. The MVp, MVi and MVd are defined by the following Equations 2 to 4, respectively.

$$MVp = Kp(SV - PV) \qquad \text{Equation 2}$$

$$MVi = Ti_A^{\circledast}(SV - PV)dt \qquad \text{Equation 3}$$

$$MVd = Td\frac{d}{dt}(SV - PV) \qquad \text{Equation 4}$$

Here, Kp, Ti and Td denote predetermined gain values, respectively.

In the Equation 2, the gain value Kp, the speed command signal SV and the speed detection signal PV are previously known values, and the speed difference signal can be calculated using these values.

When assuming that the value of the speed difference differential signal MVd is '0,' it is possible to calculate the speed difference integral signal MVi included in the driving signal MV outputted by the PID operator 400.

In this embodiment, the speed difference integral calculator 420 calculates the speed difference integral signal MVi included in the driving signal MV outputted by the PID operator 400 as described above, and the calculated speed difference integral signal MVi is inputted to the PID operator 400 so as to be included in the driving signal MV.

Thus, according to this embodiment, in a case where the operational mode of the PID operator 400 is changed from the manual mode into the automatic mode, the PID control is not performed from the initial operation of the PID operator 400 to obtain the driving signal MV in the automatic mode, but the PID control can be performed from the value of the driving signal MV that has been finally outputted in the manual mode.

Further, the operational mode of the PID operator 400 is smoothly changed from the manual mode to the automatic mode through the PID operation of the PID operator 400 without an error such as a response delay, so that it is possible to prevent vibration of the driving signal MV.

In the apparatus for changing a mode in a PID controller according to the present invention, a driving signal outputted by the PID controller is filtered using a high-frequency filter when the operational mode of the PID controller is changed from the automatic mode to the manual mode, so that it is possible to reduce an impact caused in the mode change and to drive a load by stably changing the automatic mode into the manual mode.

Further, when the operational mode of the PID controller is changed from the manual mode into the automatic mode, a speed difference integral signal is extracted from elements contained in a PID control signal and then included in the driving signal, so that it is possible to smoothly change the manual mode into the automatic mode, to stably drive the load by preventing the situation of a rapid low load or rapid high load, and to induce the speed to rapidly approach a desired speed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for changing a mode between an automatic mode and a manual mode in a proportional integral differential (PID) controller, the apparatus comprising:
    a PID operator configured to generate a driving signal by performing a PID operation selectively in the automatic mode based on an automatic mode change signal or the manual mode based on a manual mode change signal;
    a manual mode buffer configured to perform high-frequency filtering on the driving signal generated by the PID operator during a predetermined time and to output the filtered driving signal to a load driver when the manual mode change signal is generated and the PID operation is performed in the manual mode; and
    a speed difference integral calculator configured to calculate a speed difference integral signal included in the driving signal generated by the PID operator and to output the calculated speed difference integral signal to the PID operator when the automatic mode change signal is generated and the PID operation is performed in the automatic mode,
    wherein the PID operator generates the driving signal based on the calculated speed difference integral signal when the automatic mode change signal is generated.

2. The apparatus of claim 1, wherein the manual mode buffer comprises:
    a timer configured to generate a switching signal during the predetermined time when the manual mode change signal is generated;
    a filter configured to buffer the driving signal generated by the PID operator; and
    a plurality of switches configured to input the driving signal generated by the PID operator to the filter or bypass the driving signal generated by the PID operator to the load driver, based on the switching signal.

3. The apparatus of claim 2, wherein the filter is a lag filter that performs the high-frequency filtering on the driving signal outputted by the PID operator.

4. The apparatus of claim 1, wherein the PID operator generates the driving signal by replacing a speed difference integral signal of a driving signal to be generated with the speed difference integral signal calculated by the speed difference integral calculator at an initial stage in which the automatic mode change signal is generated.

5. The apparatus of claim 1, wherein the load driver is configured to receive the driving signal generated by the PID operator so as to generate driving power corresponding to the received driving signal.

6. A method for changing a mode between an automatic mode and a manual mode in a proportional integral differential (PID) controller, the method comprising:
    generating a driving signal by performing a PID operation selectively in the automatic mode based on an automatic mode change signal or the manual mode based on a manual mode change signal;
    performing high-frequency filtering on the driving signal during a predetermined time and outputting the filtered driving signal to a load driver when the manual mode change signal is generated and the PID operation is performed in the manual mode; and
    calculating a speed difference integral signal included in the driving signal and outputting the calculated speed difference integral signal when the automatic mode change signal is generated and the PID operation is performed in the automatic mode,
wherein the calculating the speed difference integral signal and outputting the calculated speed difference integral signal comprises generating the driving signal by replacing a speed difference integral signal of a driving signal to be generated with the calculated speed difference integral signal at an initial stage in which the automatic mode change signal is generated.

7. The method of claim 6, wherein performing the high-frequency filtering and outputting the filtered driving signal comprises:
generating a switching signal based on the manual mode change signal during the predetermined time;
performing the high-frequency filtering on the generated driving signal based on the switching signal; and
bypassing the generated driving signal to the load driver after the predetermined time.

\* \* \* \* \*